United States Patent [19]
Shimizu et al.

[11] Patent Number: 5,869,107
[45] Date of Patent: Feb. 9, 1999

[54] FABRICATION MACHINE OF OPTICAL FIBER

[75] Inventors: Susumu Shimizu; Akio Sakihara, both of Tokyo; Kinya Kumazawa; Hiroshi Tabata, both of Kanagawa, all of Japan

[73] Assignees: Tanaka Kikinzoku Kogyo K.K.; Nissan Motor Co., Ltd., both of Japan

[21] Appl. No.: 724,747

[22] Filed: Oct. 2, 1996

[30] Foreign Application Priority Data

Oct. 2, 1995 [JP] Japan ..................................... 7-278305

[51] Int. Cl.⁶ .................................................. B29C 47/012
[52] U.S. Cl. .................. 425/131.5; 425/461; 264/171.1; 264/172.13
[58] Field of Search ................................. 425/131.5, 461; 264/172.13, 171.1

[56] References Cited

U.S. PATENT DOCUMENTS

| | | | |
|---|---|---|---|
| 3,692,423 | 9/1972 | Okamoto et al. | 264/172.13 |
| 3,716,614 | 2/1973 | Okamoto et al. | 425/131.5 |
| 3,778,208 | 12/1973 | Bisset et al. | 425/131.5 |
| 4,251,200 | 2/1981 | Parkin | 425/131.5 |
| 4,350,006 | 9/1982 | Okamoto et al. | 264/172.13 |
| 4,445,833 | 5/1984 | Moriki et al. | 264/172.13 |
| 4,732,716 | 3/1988 | Sakunaga et al. | 425/131.5 |

FOREIGN PATENT DOCUMENTS

| | | |
|---|---|---|
| 14185 | 6/1968 | Japan . |
| 60-162804 | 8/1985 | Japan .................................. 264/172.13 |
| 61-184874 | 8/1986 | Japan . |
| 228042 | 3/1987 | Japan . |
| 1-291206 | 11/1989 | Japan . |
| 3-5532 | 1/1991 | Japan . |
| 07226787 | 8/1995 | Japan . |
| 08218218 | 8/1996 | Japan . |
| 08226012 | 9/1996 | Japan . |

*Primary Examiner*—Jay H. Woo
*Assistant Examiner*—Robert Hopkins
*Attorney, Agent, or Firm*—Klauber & Jackson

[57] ABSTRACT

In a fabrication machine of sea island type optical fiber having a plurality of wings by spinning, when a sea part polymer is insufficiently supplied into space between the adjacent wings to cause fusion of the adjacent wings, failing in producing an optical fiber having the desired optical characteristics. The present invention solved this problem. A guide member introduces the sea part polymer supplied from sea part polymer inlets into flow paths or slits between projection wings of a partition wall for a flow path control of an island part. A sufficient amount of sea part polymer is supplied to the space between the adjacent wings of an island part of the obtained optical fiber and an optical fiber having the desired optical characteristics can be obtained.

4 Claims, 6 Drawing Sheets

FIG. 1A
Prior Art
FIG. 1B
Prior Art
FIG. 1C
Prior Art
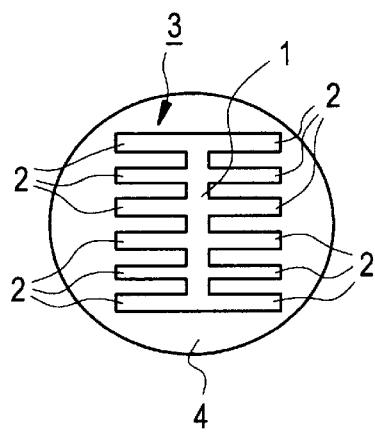
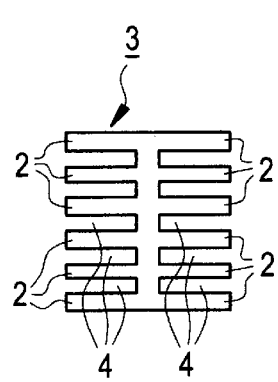
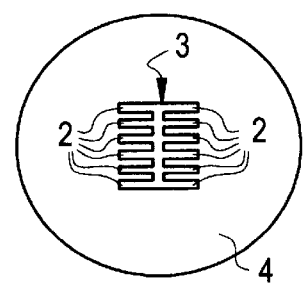
FIG. 2
Prior Art
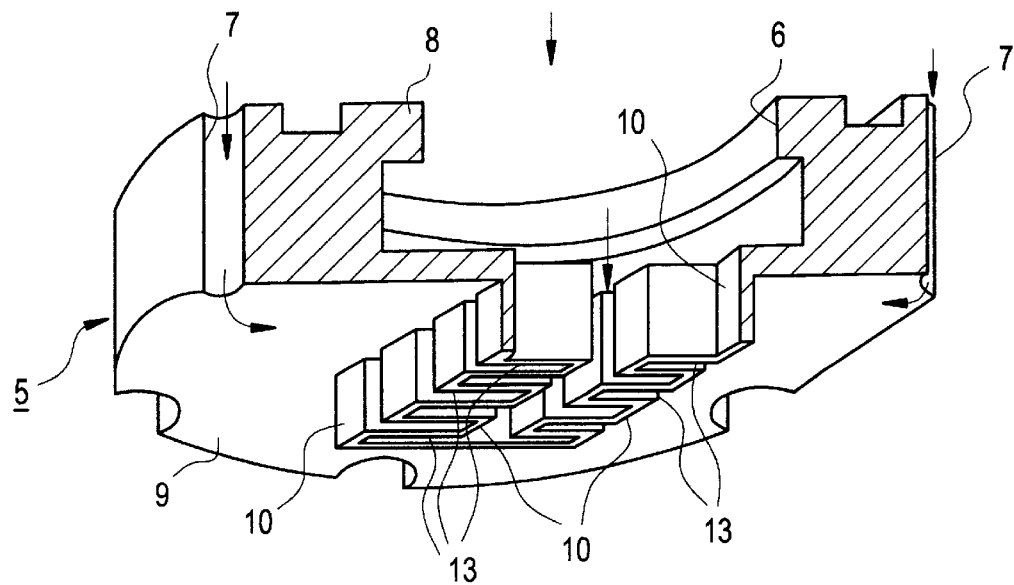

FABRICATION MACHINE OF OPTICAL FIBER

BACKGROUND OF THE INVENTION

The present invention relates to a fabrication machine of high performance optical fiber using a melt spinning method, and more particularly to a fabrication machine for reliably spinning high performance sea island optical fiber composed of at least two kinds of fibers into a predetermined shape.

Conventionally, a coloring structural body in which color is changed depending on a direction to be seen and which is elegant and high-grade feeling and has a color tone of higher saturation, has been required from users' multi-taste and high rank orientation. This requirement cannot be achieved by only coloring matters such as dyes, pigments and the like but by a structural body colored by reflection, interference, diffraction or scattering of light, or a combination of this coloring function and such coloring matters, and deeply and vividly coloring structural bodies have been energetically researched and developed.

Many proposals have so far been done, for example, a composite fiber constituted by at least two resins with different optical refractive indexes, having pearly luster (Japanese Patent Publication Gazette No. 43-14185, Japanese Patent Laid Open Gazette No. 1-139803); a coloring material having a sandwich construction composed of one molecular orientation anisotropic film and two polarizing films sandwiching the film between (Proceedings of the Textile Machinery Society of Japan, Vol. 42, No. 2, p. 55 and No. 10, p. 60, 1989); a coloring structural body utilizing the coloring of Morphinae butterfly from South America, which is famous for which the color tone is changed depending on a direction to be seen and has vivid color tone efficiency (Japanese Patent Laid Open Gazette No. Sho 59-228042, Japanese Patent Publication Gazette No. 60-24847, Japanese Patent Publication No. Sho 63-64535); and a structural body emitting an interference color by forming fine slits having a fixed width on fiber surface (Japanese Patent Laid Open Gazette No. 62-170510, Japanese Patent Laid Open Gazette No. 63-120642).

However, for these coloring structural bodies, various problems arise for their practical uses, for example, it is difficult to control conditions for attaining a predetermined function, and a spinneret suitable for keeping a composite fiber having a complicated shape cannot be obtained.

The present applicants have developed coloring optical fiber having a vivid color taste changeable in a direction to be seen and a reflection interference function without a change with the elapse of time (Japanese Patent Laid Open Gazette No. 6-17349). This optical fiber has a cross section of a sea island type, as shown in FIG. 1a, and comprises a core 1 extending in a longitudinal direction, six pairs of wing portions 2 connected to, and arranged with slits therebetween on, both the sides of the core 1, the core 1 and the wing portions 2 constituting an island part 3, and a sea part 4 filling up the periphery of the island parts 3 and the slits between the wing portions 2. The island part 3 and the sea part 4 of the sea island type optical fiber are made different in their optical refractive indexes to provide an optical fiber having a vivid color and a color taste changeable in a direction to be seen. Usually, the sea part of the optical fiber is dissolved and only the island part is used as the optical fiber, as shown in FIG. 1b.

In order to manifest the optical function of this optical fiber, it is necessary to ensure the foregoing shape and dimensions. The above described optical fiber is constituted by the wing portions having a thickness of approximately 0.01 to 0.1 mm, and it is the most essential point in the steps from the polymer dissolution to the fiber preparation to certainly separate the slits between the adjacent wind portions 2 to maintain the predetermined shape. However, when spinning the molten polymer, the spacing between the adjacent wing portions 2 is narrow and a mutual contact or fusion is often caused in the wing portions 2.

In order to solve this drawback, the present applicant has developed a spinneret for use in fabricating an optical fiber, as shown in FIGS. 2 and 3 (Japanese Patent Application No. 7-28519 and Japanese Patent Application No. 7-28521). FIG. 2 is a perspective view, partly in section, seen from the lower side, of a spinneret for fabricating an optical fiber, omitting a lower funnel-shaped nozzle portion and FIG. 3 is a longitudinal cross section of the spinneret shown in FIG. 2, including the lower nozzle portion.

In FIGS. 2 and 3, the spinneret 5 includes a ring-shaped spinning head 8 having polymer inlets 6 and 7 for the island and sea parts 3 and 4, a bottom 9, and a concavo-convex-shaped partition wall 10 for a flow path control of the island part 3, mounted on the bottom 9, so as to surround the space corresponding to the island part 3 in its upper half. The spinneret 5 also includes a spinning seat 12 having a funnel-shaped spinning nozzle 11 in its center under the spinning head 8 in its lower half.

In FIG. 3, as shown by arrows, a polymer for the island part 3 is introduced from the polymer inlet 6 into the inside of the partition wall 10 and another polymer for the sea part 4 from the polymer inlet 7 into the peripheral space of the partition wall 10, resulting in forming the shapes corresponding to the island part 3 and the sea part 4 of the optical fiber, as shown in FIG. 1a, in conformity to the internal and external shapes of the partition wall 10. The two polymers contact their conforming surfaces to each other to integrate, while moving down in the spinning nozzle 11, to spin into a sea island type optical fiber, as shown in FIG. 1a.

In this spinning method, when the sea part polymer is introduced form the polymer inlet 7 into the space or slits 13 of the adjacent external projection wings of the partition wall 10 shown in FIG. 2, the sea part polymer enters the slits sufficiently between the adjacent wing portions 2 and the spinning is carried out as it is. As a result, the adjacent wind portions 2 are spun into the predetermined shape without a welding to produce an optical fiber having the foregoing desired characteristics.

However, as described above, this optical fiber is of a very fine size, and the slits between the adjacent wing portions 2 are finer. As shown by the arrows in FIG. 3, two flow paths of the sea part polymer are formed in the spinneret 5 of the optical fiber, that is, the flow path passing through the slits 13 and the flow path not passing through the slits 13. When the polymer passes through the slits 13, the resistance against the polymer flow is rather high. Accordingly, almost all the sea part polymer comes into the funnel-shaped spinning nozzle 11 without passing through the slits 13, and the spinning is liable to be performed in the state that a sufficient amount of the sea part polymer is not supplied within the slits between the wings 2 shown in FIG. 1a.

When the height of the projected partition wall 10 is high, the chance that the polymer enters the slits 13 becomes large, the amount of the polymer passing through the slits 13 increases. However, concerning the actual aspect of processing, it is pretty difficult to carry out a machining of such fine partition wall 10. In particular, when the height of the partition wall 10 increases, the machining becomes more difficult. Accordingly, it is demanded that the height of the partition wall 10 is restricted to be low, but in such a low partition wall, the amount of the polymer passing through the slits 13 is apt to further diminish.

In the optical fiber spun in this manner, the adjacent wing portions 2 tend to contact to each other or to be fusible, and the optical fiber often fails to have the required optical characteristics. This is a main cause to prevent from its practical use.

As described above, the optical fiber is spun as a fiber having very fine concave-convex surfaces. In such an optical fiber, in order to manifest a reflection interference function, assuming that a thickness and an optical refractive index of wing portions are db and nb, respectively, and a thickness and an optical refractive index of air space between the wing portions are da and na, respectively, and that a reflection wavelength of light is λ in a case of a vertical incidence of light, the following formula is given:

$$\lambda = 2(nada + nbdb) \tag{1}$$

Particularly, when both are equal in their optical thickness, that is, nada=nbdb, the optical function is maximum. The optical thickness is defined as a "geometric thickness (simple 'thickness' usually used)×optical refractive index" of each of the wing portions and the air space between the wing portions.

Accordingly, a thickness of one wing portion is a value which is obtained by dividing the reflection wavelength λ (coloring wavelength in a visible light area) by 4 times of the optical refractive index of the island part fiber. For example, in the case of blue color, when the island part is formed by a PET (polyethylene terephthalate) polymer with respect to a blue color wavelength=0.47 mm, this value is divided by 4 times of the optical refractive index 1.56 of the PET polymer to obtain the thickness approximately 0.08 mm of the wing portions. It has been found that, when the optical fiber is provided with at least 8 slices of fine wings, the coloring effect is raised. Even when the spacing of the air space between the wind portions is determined to 0.12 mm, the thickness of one optical fiber is 8×0.08 mm+7×0.12 mm=1.48 mm which is still very fine. On the other hand, When optical fibers having different optical thicknesses are produced by using the same spinneret, the discharge amount ratio between the sea part polymer and the island part polymer to be supplied into the spinning nozzle 11 shown in FIG. 3 is controlled. When the amount of the sea part polymer to be supplied into the spinning nozzle 11 is more than that of the island part polymer, the amount of the sea part polymer occupied in the cross section of the optical fiber after the spinning is much and an optical fiber having a small size island part is obtained, as shown in FIG. 1c, and by dissolving out the sea part, a small size optical fiber having the same shape as shown in FIG. 1b can be prepared.

In such a small size optical fiber, if a further sufficient amount of sea part polymer is not supplied into the slits between the wing portions, an optical fiber is not spun into the predetermined shape and an optical fiber having the further desired optical characteristics cannot be provided.

SUMMARY OF THE INVENTION

It is therefore an object of the present invention to provide a fabrication machine of optical fiber in view of the problems of the prior art, which is capable of preventing a mutual contact or fusion of adjacent wings themselves to fabricate optical fiber having the desired optical characteristics.

In accordance with one aspect of the present invention, there is provided a fabrication machine of optical fiber, comprising a spinning head including a partition wall, mounted on a bottom, for a flow path control of an island part, having projection wing members of flow paths for forming wing portions of an island part, an island part polymer inlet positioned within the partition wall for supplying an island part polymer, and sea part polymer inlets positioned in a peripheral part of the partition wall for supplying a sea part polymer, a plurality of projection wing members being aligned inn parallel at an equal spacing in an opening of the partition wall, a ratio of a thickness of a wing portion to spaces between adjacent wing portions being in a range of 30:1 to 1:30; a spinning seat, mounted under the spinning head, having a funnel-shaped spinning nozzle for spinning the sea part polymer and the island part polymer into an optical fiber; and a guide member, mounted around the partition wall, for guiding the flow of the sea part polymer so as to introduce the sea part polymer supplied from the sea part polymer inlets to the funnel-shaped spinning nozzle through space between the adjacent projection wing members of the partition wall.

In the fabrication machine of optical fiber, the guide member preferably includes through-holes connecting the sea part polymer inlets to the funnel-shaped spinning nozzle.

The guide member is a plate having an opening to be matched to an external shape of the partition wall and having a step part to be fitted with the partition wall.

BRIEF DESCRIPTION OF THE DRAWINGS

The above and other objects, features and advantages of the present invention will more fully appear from the following description of the preferred embodiments with reference to the accompanying drawings, in which:

FIG. 1a is a cross section of one example of an optical fiber having a sea island type cross section, which can be produced by a machine according to the present invention and by a conventional technique, FIG. 1b is a cross section of an optical fiber having only an island part, prepared from the optical fiber shown in FIG. 1a, and FIG. 1c is a cross section of another example of an optical fiber like the one shown in FIG. 1a;

FIG. 2 is a perspective view, partly in section, see from a lower side, of a conventional spinneret for fabricating an optical fiber, omitting a lower funnel-shaped nozzle portion, which is proposed to solve a problem of the prior art;

DESCRIPTION OF THE PREFERRED EMBODIMENTS

The present invention will now be described in detail with reference to its preferred embodiments in connection with the accompanying drawings.

In a fabrication machine of optical fiber according to the present invention, a sufficient amount of polymer for a sea part is supplied to space or slits between adjacent flow paths for forming a plurality of projection wing members of a partition wall for a flow path control of an island part, and the polymer for the sea part and a polymer for an island part join together. The joined polymers are then spun into an optical fiber. In this spinning process, no mutual contact or fusion of the adjacent wing members is caused and a separation of the same is well done. Accordingly, an optical fiber having the desired optical characteristics can be obtained.

Figure 3:
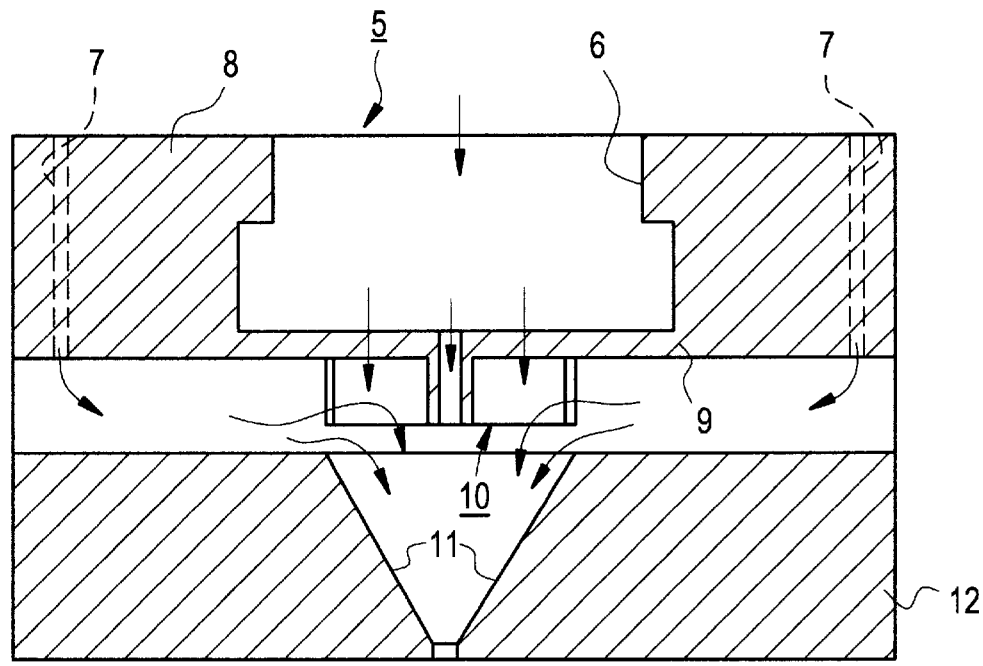
FIG. 3 is a longitudinal cross section of the spinneret shown in FIG. 2, including the lower nozzle portion.

In a conventional fabrication machine of optical fiber with a partition wall for a flow path control of an island part, as shown in FIG. 3, most of the sea part polymer introduced in the free flow space between the spinning head 8 and the spinning seat 12 from the sea part polymer inlet 7 directly flows down into the funnel-shaped spinning nozzle 11 without passing through the slits 13 between the projection wing members of the partition wall 10, but a small amount of the polymer passes through the slits having a large flow resistance. In other words, nearly all the sea part polymer reaching the partition wall 10 moves down into the funnel-shaped spinning nozzle 11 via the free flow space having nearly zero flow resistance without passing through the slits having the large flow resistance between the projection wings of the partition wall 10.

In the fabrication machine of optical fiber according to the present invention, a free flow space between a spinning head and a spinning seat, through which the sea part polymer can move down into a funnel-shaped spinning nozzle without passing through the slits between the projection wing members of the partition wall for the island part flow path control, is substantially omitted and alternatively, only a minimum amount free flow space is provided between the spinning head and the spinning seat so that a sufficient amount of sea part polymer may be supplied into the slits.

In one embodiment of the present invention, a guide plate or member having a central opening for controlling a flow amount of a sea part polymer may be fitted between the spinning head and the spinning seat so as to match the external shape of the partition wall in tight contact therewith, so that the sea part polymer introduced from the sea part polymer inlet may flow down into the spinning nozzle through only the space, i.e. a plurality of slits constituted by the central opening of the guide member and the space between the adjacent projection wings of the partition wall.

In this embodiment, all the sea part polymer introduced from the sea part polymer inlet can be supplied to the spinning nozzle via only the slits between the projection wings of the partition wall while spinning into an optical fiber, and a sufficient amount of sea part polymer can be present in space or slits between wing portions 2 of an island part 3 of the obtained optical fiber shown in FIG. 1*a*. Accordingly, an optical fiber having the desired optical characteristics can be resulted. The optical fiber, as shown in FIG. 1*a*, can be used in this state, as described above, and an optical fiber composed of only the island part can be further prepared by dissolving out the sea part using an optimum solvent.

The guide member may be prepared so as to fit with the projection wing members of the partition wall tightly in the central opening of the guide member. Further, the guide member may be fitted with the partition wall loosely in the central opening of the guide member. In this embodiment, when the flow resistance of the polymer passing through the slits is nearly equal or smaller than that passing through a free flow space, nearly satisfied sufficient amount of sea part polymer is allowed to pass through the slits so as to be supplied into the spinning nozzle. As a result, an optical fiber having adjacent wings separated perfectly from each other can be produced.

As shown in FIG. 1*c*, in order to diminish a size of an island part of an optical fiber, the amount of the sea part polymer is increased compared with that of the island part polymer. However, when the guide member is tightly fitted with the partition wall in the opening of the guide member, usually, the flow amount of the sea part polymer is nearly equal to that of the island part polymer, and it is impossible to prepare an optical fiber shown in FIG. 1*c*.

In order to obtain an optical fiber having a small island part, as shown in FIG. 1*c*, the partition wall is more loosely fitted in the opening of the guide member, i.e., the opening of the guide member is made to be larger than the peripheral size of the partition wall. Thus, the polymer flow resistance passing through the free flow path between the partition wall and the guide member is smaller than that passing through the slits, and the adjacent wing members tend to be mutually contacted or fused or welded.

In order to prevent this problem, a path or paths having a larger or equal flow resistance than that of the slits for flowing the sea part polymer are provided between the sea part polymer inlet and the spinning nozzle.

More specifically, for example, a hole or holes are formed so as to penetrate the guide member mounted between the spinning head and the spinning seat. If this through-hole is large in its diameter, the flow resistance of the through-hole is smaller than that of the slits and the sea part polymer tends to be insufficiently supplied into the slits. Accordingly, it is preferable to provide a plurality of through-holes having a small diameter and a larger flow resistance than that of the slits in the guide member.

The guide member controls the flow path of the sea part polymer introduced from the sea part polymer inlet to the spinning nozzle and promotes the supply of the sea part polymer into the slits. In other words, the guide member may have any shape to prevent the flow of the sea part polymer to the spinning nozzle without passing through the slits except through the through-holes. Accordingly, besides the guide member having the opening in its central portion, a pipe-shaped guide member directly connecting the sea part polymer inlet and the slits may be used.

The material of the guide member is not restricted in particular and any material having resistivity against the sea part polymer and the island part polymer and giving no negative influence to the same can be used.

In a fabrication of optical fiber, in practice, a plurality of optical fibers are preferably produced in one operation. A plurality of sets of spinnerets or optical fiber fabrication machines of the present invention, each set comprising a spinning head and a spinning seat, are installed to conduct a spinning operation. At this time, it is often troublesome to precisely mount the guide members around the respective partition walls of the many spinning heads. In addition, it is further complicated to connect the sea part polymer inlets and the slits of the partition walls by the pipe-shaped guide members.

When the guide plate having the opening is used, it is also troublesome to fit the guide plate with the partition wall of each spinning head while positioning the guide plate with respect to the partition wall. In order to avoid such troublesomeness, a step part is previously formed in the opening of the guide member so as to engage with the partition wall. As a result, the positioning of the guide member with respect to the partition wall can be readily carried out and the guide members can be mounted on the many spinnerets in a short time.

Each partition wall for the flow path control of the island part is formed in a concavo-convex shape, i.e., alternation of a wing, and a slit, and a path or space for flowing the island part polymer is formed in its central portion. Further, a pair of left and right longitudinal partition walls are connected at only their ends. Accordingly, its strength is relatively weak. In order to prevent this constructive weakness, left and right corresponding partition wall members are coupled preferably near the bottom of the spinning head. The influence of the coupling of the partition wall hardly appears and an optical fiber having equal characteristics to those of the no coupling case can be produced.

In order for the obtained optical fiber to exhibit its optical characteristics, it is necessary to design the island part of which a ratio of a thickness of a wing portion to a spacing or slit between adjacent wings is in a range of 30:1 to 1:30, and the partition wall of the spinning head is required to have its similar figure.

As to the sea part polymer and the island part polymer to be used in the optical fibers spun by the present machine, as clear from the foregoing formula 1, it is sufficient that their optical characteristics, particularly, optical refractive indexes are different. For example, polyolefins such as polyethylene, polypropylene and the like, polyesters such as polyethylene terephthalate, polytetramethylene terephthalate and the like, polystyrene, polycarbonate, polyfluoroethylene, polyacetals, poly-phenylene sulfide, polymethyl methacrylate and the like can be used, and copolymers and mixed polymers of these compounds can be also used.

In the case where the sea part polymer is dissolved out to use only the island part as an optical fiber, as shown in FIG. 1b, of course, two polymers having different solubilities in addition to the optical refractive indexes are used. One example of a preferable combination is polystyrene as the sea part polymer and polystyrene terephthalate as the island part polymer.

Next, a fabrication machine of optical fiber according to the present invention will be further described in detail in connection with its embodiments with reference to the accompanying drawings, and it is readily understood that the present invention is not restricted to the specific embodiments.

Figure 4:
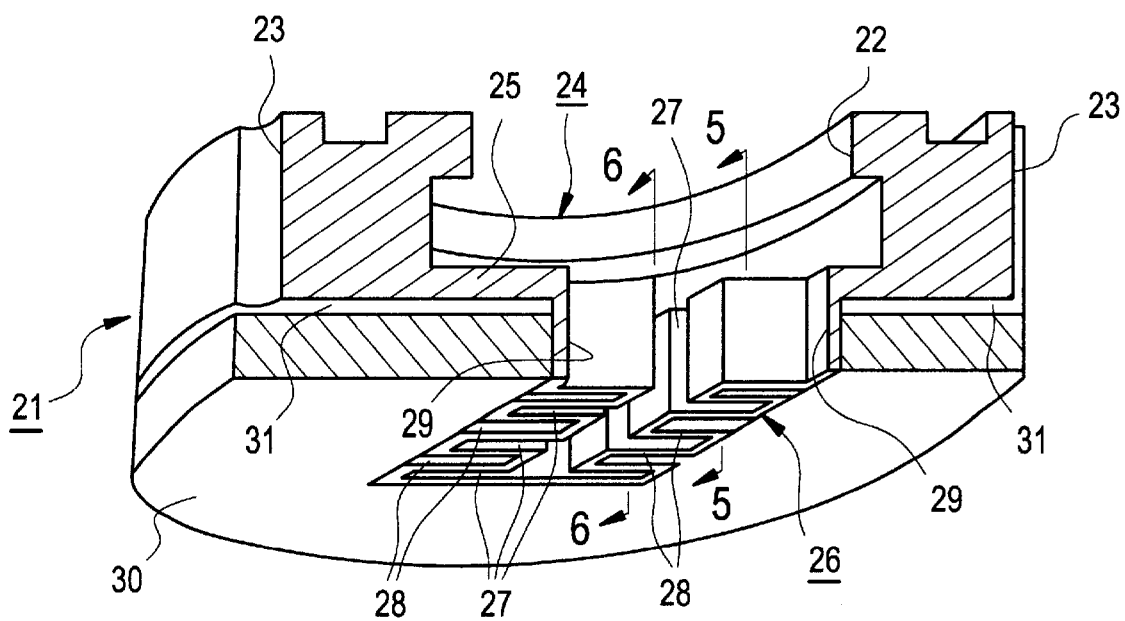
FIG. 4 is a perspective view of a first embodiment of a fabrication machine of optical fiber, omitting a lower funnel-shaped spinning nozzle, according to the present invention.
Figure 5:
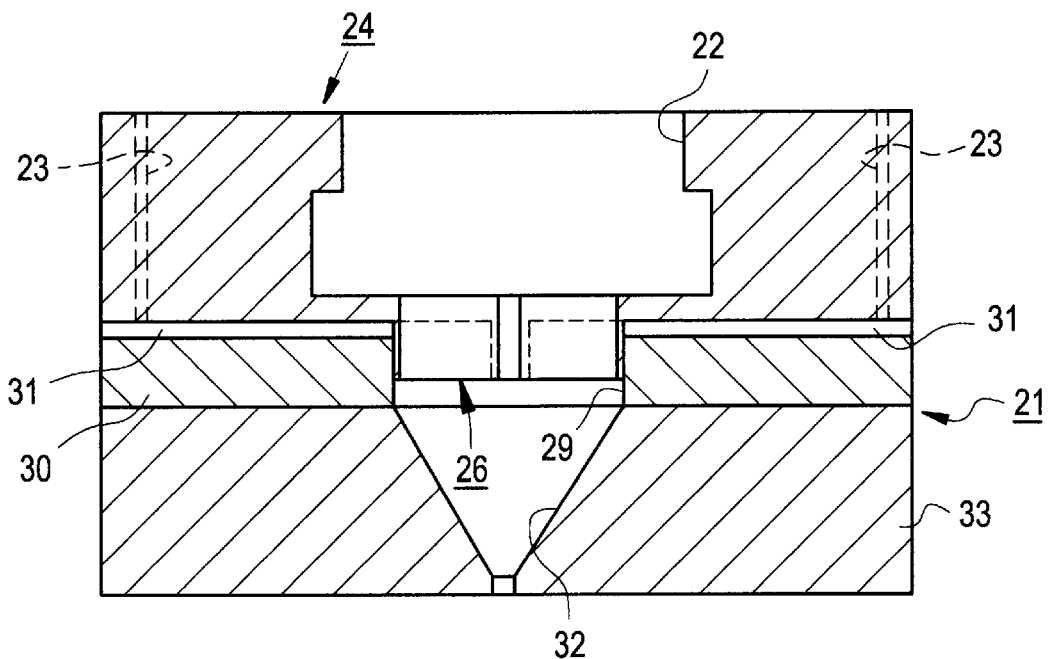
FIG. 5 is a longitudinal cross section, taken along the line A—A shown in FIG. 4, of the optical fiber fabrication machine including the lower funnel-shaped spinning nozzle.
Figure 6:
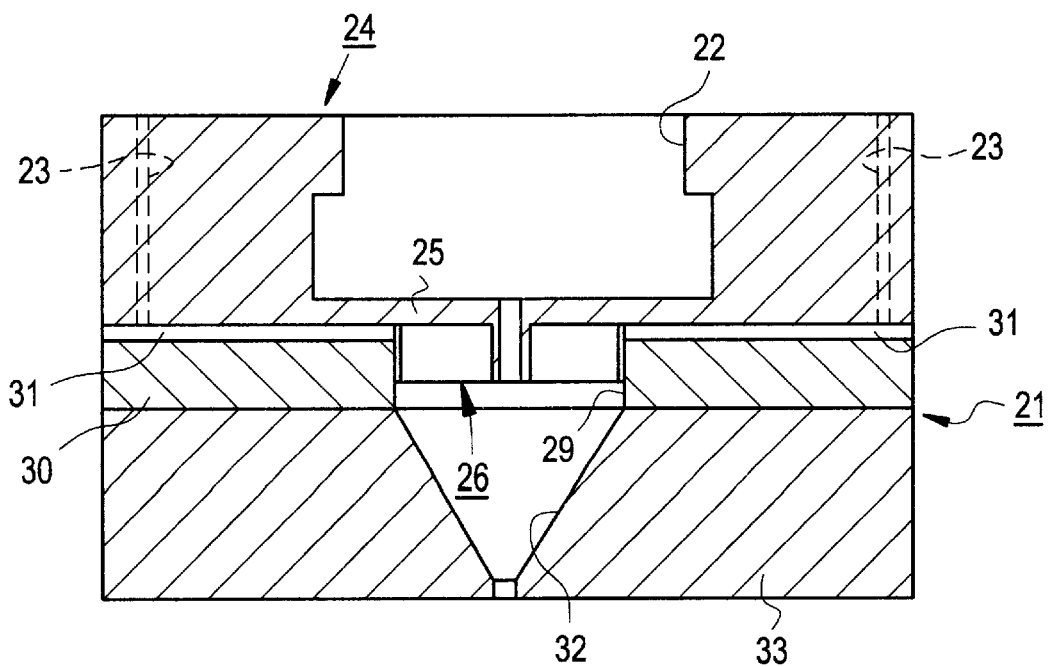
FIG. 6 is a longitudinal cross section, taken along the line B—B shown in FIG. 4, of the optical fiber fabrication machine including the lower funnel-shaped spinning nozzle.

FIG. 4 to FIG. 6 show a first embodiment of a fabrication machine of optical fiber according to the present invention. FIG. 4 is a perspective view, seen from a lower side, of the fabrication machine, omitting a lower funnel-shaped spinning nozzle, FIG. 5 is a longitudinal cross section, taken along the line A—A shown in FIG. 4, including the lower funnel-shaped spinning nozzle, and FIG. 6 is a longitudinal cross section, taken along the line B—B shown in FIG. 4, including the lower funnel-shaped spinning nozzle.

In FIGS. 4 to 6, the fabrication machine 21 of optical fiber comprises a ring-shaped spinning head 24 in its upper half, a spinning seat 33 in its lower half, and a circular-plate-shaped guide member 30 interposed therebetween. The ring-shaped spinning head 24 includes an island part polymer inlet 22 having a relatively large diameter in its center, a plurality of sea part polymer inlets 23 in its peripheral part, a bottom 25, and a concavo-convex-shaped partition wall 26 for a flow path control of the island part, mounted on the bottom 25, so as to surround the space corresponding to the island part. Flow paths 27 of the island part polymer are formed inside the partition wall 26, and flow paths (space or slits between adjacent projection wings) 28 for the sea part polymer outside the partition wall 26.

Around the partition wall 26, the guide member 30 having an opening 29 to be matched to the external shape of the partition wall 26 in its central portion is fitted between the spinning head 24 and the spinning seat 33 in contact with the partition wall 26 so that a space may be formed between the bottom 25 of the spinning head 24 and the guide member 30 itself, this space constituting a guide path 31 for introducing the sea part polymer supplied from the sea part polymer inlets 23 into the slits 28 of the partition wall 26.

The guide member 30 is mounted on the spinning seat 33 having a funnel-shaped spinning nozzle 32 matched to the opening 29 of the guide member 30.

In the above described fabrication machine of optical fiber, when the island part polymer and the sea part polymer are supplied from the island part polymer inlet 22 and the sea part polymer inlets 23, respectively, the island part polymer is directly introduced into the flow paths 27 of the partition wall 26 to move down, and the sea part polymer passes from the lower ends of the sea part polymer inlets 23 through the guide path 31 to reach the slits 28 of the partition wall 26. Since there is no other flow passes for the sea part polymer, all the sea part polymer is introduced into the flow paths 28 of the partition wall 26 and flows down therein.

Both the polymers supplied in the flow paths 27 and 28 inside and outside the partition wall 26 move down along the partition wall 26, join together under

TABLE 1

(Specification of Composite Spinning Machine)

| | Items | 1st Extruder (B Block) | 2nd Extruder (A Block) |
|---|---|---|---|
| Molten (Extrusion) Part | Screw Diamater (mm) | φ 25 | φ 25 |
| | Screw Revolution (rpm) | 8–80 | 5–50 |
| | Max. Use Temp. (°C.) | 350 | 400 |
| | Number of Heater Zones | 3 zones | 4 zones |
| | Gear Pump Revolution (rpm) | 14–40 | 3–30 |
| | Capacl (cc/REV) | 0.3 | 0.6 |
| | Extruder-Gear Pump Control | Manual | Feedback |
| Head Part | Relief Valve of Molten Polymer | | Provided | the partition wall 26, and drop in the funnel-shaped spinning nozzle 32 to be spun into an optical fiber.

In the spinning of the optical fiber in this manner, all the sea part polymer passes through the flow paths 28 of the partition wall 26, and a sufficient amount of sea part polymer is present in the slits between the adjacent wing portions 2 of the optical fiber shown in FIG. 1a. Accordingly, the mutual contact or fusion is not caused in the adjacent wing portions 2, and the optical characteristics of the obtained optical fiber cannot be damaged.

Figure 7:
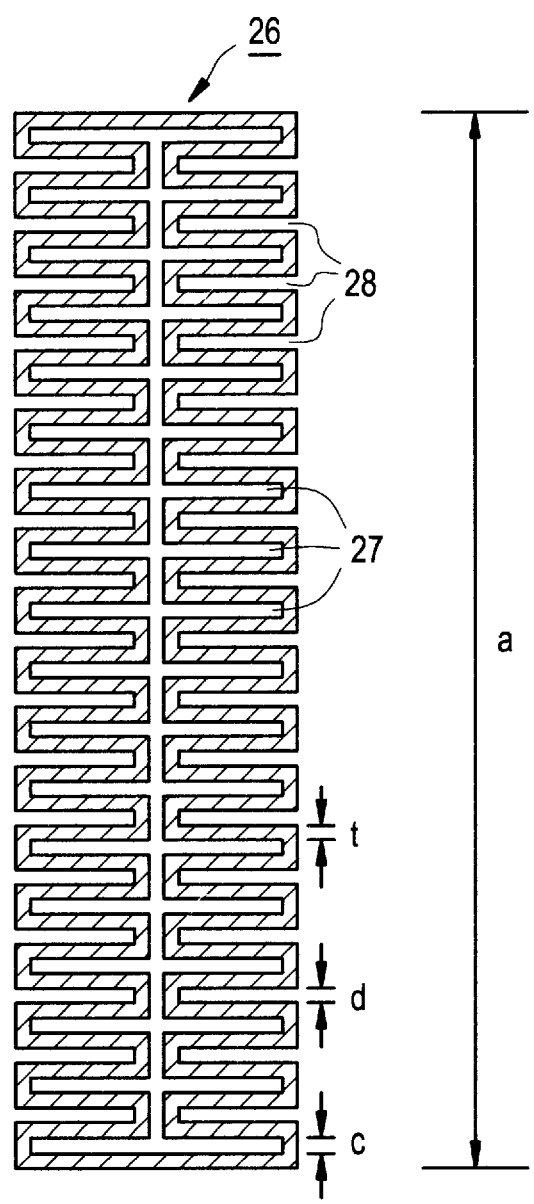
FIG. 7 is a cross section of a partition wall opening for a flow path control of an island part for use in the machine shown in FIG. 4.

A spinning is carried out using a fabrication machine of optical fiber, shown in FIGS. 4 to 6, and spinning extruders of composite fiber with a specification shown in Table 1 as a specific embodiment. An opening shape of a partition wall for a flow path control of an island part is shown in FIG. 7. The partition wall includes 17 wing members connected in parallel on each of the left and right sides along with its dimensions such as an entire thickness (length) a=15.0 mm, an entire width b=4.2 mm, a thickness c=0.2 mm corresponding to one wing member, space or a slit d=0.3 mm between adjacent wing members, and a thickness t=0.2 mm at all portions of the partition wall. This partition wall is fitted in a rectangular opening having an internal size of 4.2 mm×15.4 mm of the guide plate 30, thereby setting the partition wall. The island part polymer passing through the flow paths 27 within the partition wall 26 and the sea part polymer passing through the slits 28 surrounded by the partition wall 26 and the guide member 30 drop in the funnel-shaped spinning nozzle 32 while being spun by the spinning nozzle 32, discharging an optical fiber from a discharge hole. The size of the discharge hole is 4.3 mm×0.1 mm.

The obtained optical fiber has dimensions such as a thickness 0.08 $\mu$m of the wing, space or slit 0.12 $\mu$m between the adjacent wing members, an entire fiber thickness (length) 50 $\mu$m in the direction of aligned wing members, and an entire width 3.28 $\mu$m and exhibits the desired optical characteristics.

Figure 8:
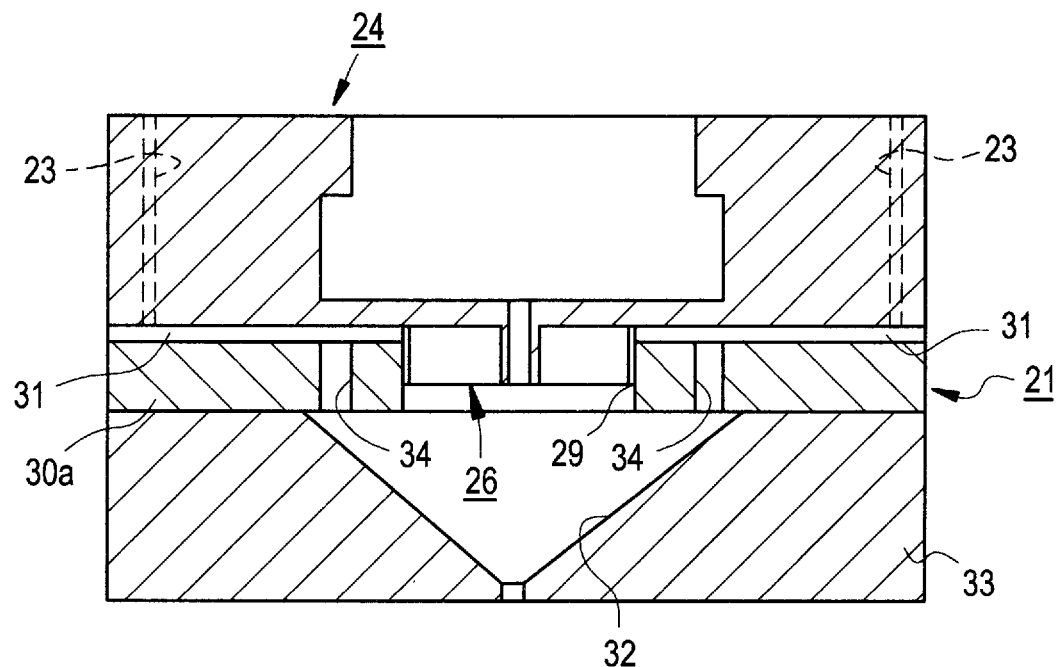
FIG. 8 is a longitudinal cross section of a second embodiment of a fabrication machine of optical fiber according to the present invention.

FIG. 8 is a longitudinal cross section of a second embodiment of a fabrication machine of optical fiber according to the present invention. This embodiment is an improvement of the first embodiment described above. The same reference characters denote the same or corresponding parts as those in the first embodiment and thus the description thereof can be omitted for brevity.

In this embodiment, a circular guide member 30a having a central opening 29, to be fitted with the partition wall 26, is provided with a plurality of through-holes 34 having a relatively small diameter, which are arranged radially in somewhat outer position of the opening 29. The through-holes 34 connect the guide path 31 for the sea part polymer and the funnel-shaped spinning nozzle 32 so as to bypass a part of the sea part polymer supplied from the sea part polymer inlets 23 to the spinning nozzle 32 without passing through the flow paths or slits 28 of the partition wall 26, resulting in increasing the rate of the sea part polymer with respect to the island part polymer in the cross section of the spun optical fiber. As a result, an optical fiber having a small island part in its cross section can be obtained, as shown in FIG. 1c, and a small-sized optical fiber can be prepared.

Figure 9:
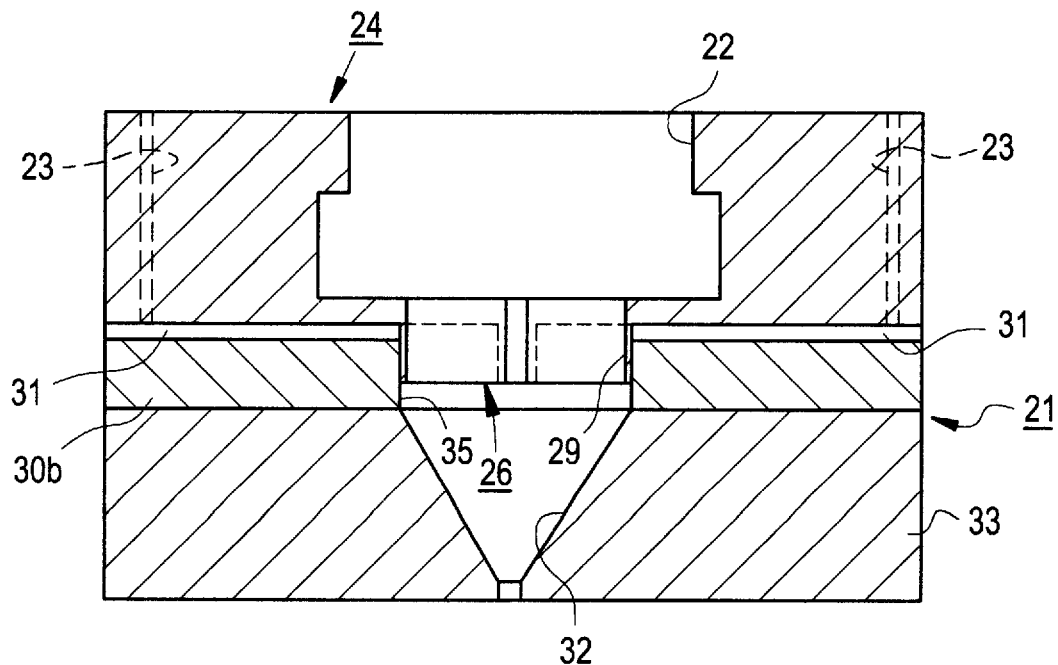
FIG. 9 is a longitudinal cross section of a third embodiment of a fabrication machine of optical fiber according to the present invention.

FIG. 9 is a longitudinal cross section of a third embodiment of a fabrication machine of optical fiber according to the present invention. This embodiment is also an improvement of the first embodiment described above. The same reference characters denote the same or corresponding parts as those in the first embodiment and thus the description thereof can be omitted for brevity.

In this embodiment, a circular guide member 30b having a central opening 29, to be fitted with the partition wall 26, is provided with a step part 35 in the lower end portion of the opening 29 so as to project its inside. This step part 35 permits the guide member 30b to be exactly and easily fitted with the partition wall 26. In other words, by engaging the lower end of the partition wall 26 with the step part 35 in the opening 29 of the guide member 30b, the guide member 30b can be mounted on the partition wall 26 in a short time while carrying out an exact positioning of the same.

Figure 10:
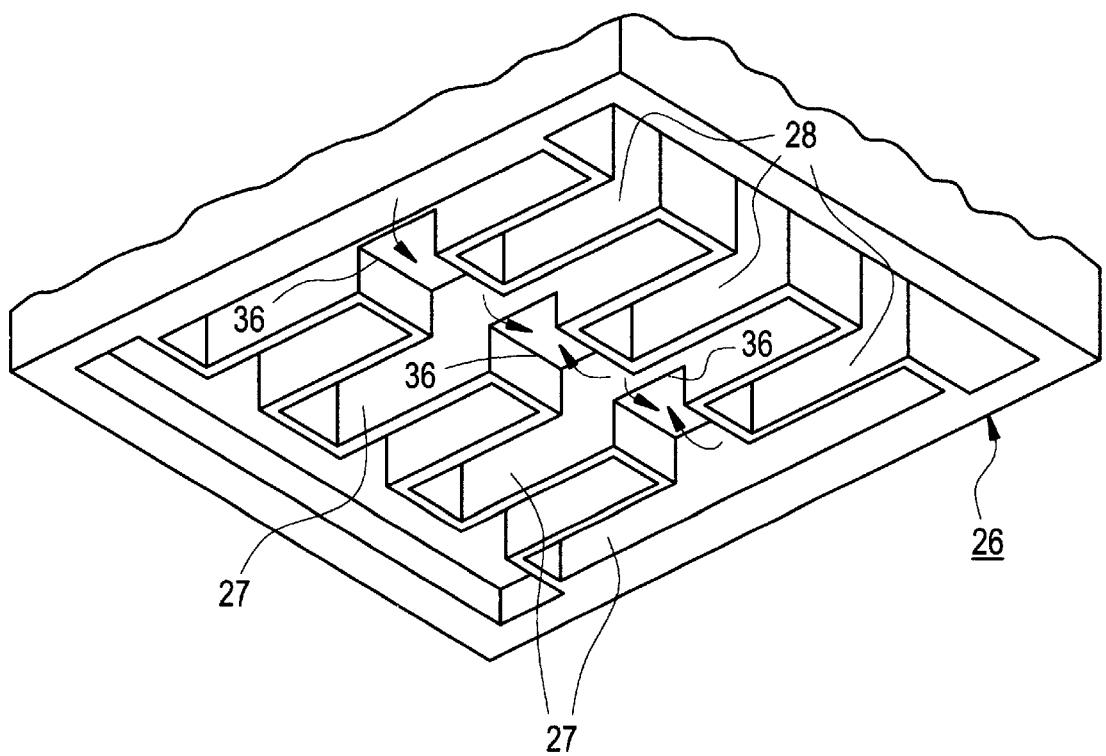
FIG. 10 is a perspective view, partly in section, seen from a lower side, of a partition wall for a flow path control of an island part for use in a fourth embodiment of a fabrication machine of optical fiber according to the present invention.

FIG. 10 shows a fourth embodiment of a fabrication machine of optical fiber according to the present invention and is a perspective view, partly in section, seen from a lower side, of a partition wall for a flow path control of an island part. This embodiment is also an improvement of the first embodiment described above. The same reference characters denote the same or corresponding parts as those in the first embodiment and thus the description thereof can be omitted for brevity.

In this embodiment, similar to the first embodiment, the space in the machine is divided into the internal flow paths 27 for the island part polymer and the external slits 28 for the sea part polymer by the partition wall 26 for the flow path control of the island part. In this embodiment, different from the first embodiment shown in FIGS. 4 to 6, the space of the flow paths 27, positioned between a pair of opposite flow paths 28, are not connected in the longitudinal direction and are closed except lower step portions 36 between the pair of opposite flow paths 28.

In such a construction, the pair of opposite slits 28 for the sea part polymer are connected so as to raise the strength of the partition wall 26. Of course, the sea part polymer can flow into the lower step portions 36 of the flow paths 27, and no negative influence can be given to the optical characteristics of the obtained optical fiber.

As described above, a fabrication machine of optical fiber, comprises a spinning head including a partition wall, mounted on a bottom, for a flow path control of an island part, having projection wings of flow paths for forming wing members of an island part, an island part polymer inlet positioned within the partition wall for supplying an island part polymer, and sea part polymer inlets positioned in a peripheral part of the partition wall for supplying a sea part polymer; a spinning seat, mounted under the spinning head, having a funnel-shaped spinning nozzle for spinning the sea part polymer and the island part polymer into an optical fiber; and a guide member, mounted around the partition wall, for guiding the flow of the sea part polymer so as to introduce the sea part polymer supplied from the sea part polymer inlets to the funnel-shaped spinning nozzle through space between the adjacent projection wings of the partition wall.

In the fabrication machine of optical fiber of the present invention, the sea part polymer supplied from the sea part polymer inlet is guided by the sea part polymer guide member so as to be exactly supplied into the slits between the projection wings of the partition wall, and the sea part polymer then joins together with the island part polymer passed through the inside of the partition wall 26. Accordingly, in the obtained optical fiber, the slits between the wing members are sufficiently filled with the sea part polymer to prevent a mutual contact or fusion of the adjacent wings of the island part. As a result, the optical characteristics of the optical fiber are not damages and the optical fiber having the desired optical characteristics can be obtained.

Preferably, this guide member is tightly contacted to the partition wall. However, a small gap can be formed between the guide member and the partition wall as long as the flow resistance of the polymer passing through the gap is equal to, or smaller than, that passing through the slits of the partition wall 26.

According to the present invention, when an optical fiber having a large sea part or having a small island part is required, a sea part can be enlarged compared with an island part in its cross section of the obtained optical fiber. In such a case, through-holes connecting the sea part polymer inlets to the funnel-shaped spinning nozzle are provided in the guide member. In order to prevent a larger amount of sea part polymer than a predetermined amount from flowing to the funnel-shaped spinning nozzle through the through-holes, a plurality of through-holes having a small diameter are preferably provided in the guide member.

Further, it is preferable that a plurality of optical fibers are produced in one operation, and a plurality of fabrication machines of optical fiber are required to be installed in parallel.

However, the fabrication machine of optical fiber is a very delicate apparatus suited to the size of the obtained optical fiber, and it is often troublesome to mount many guide member one by one around the respective partition wall in the fabrication machines.

In order to avoid such troublesomeness, the guide member is made to be a plate having an opening to be matched to an external shape of the partition wall and having a step part to be fitted the partition wall with the step part of the guide member, the guide member can be readily fitted with the partition wall in a short time while positioning the guide member exactly.

Although the present invention has been described in its preferred embodiments with reference to the accompanying drawings, it readily understood that the present invention is not restricted to the preferred embodiments and that various changes and modifications can be made by those skilled in the art without departing from the spirit and scope of the present invention.

What is claimed is:

1. A fabrication machine of optical fiber, comprising:

a spinning head including a partition wall, mounted on a bottom, for a flow path control of an island part, having projection wing members of flow paths for forming wing portions of an island part, an island part polymer inlet positioned within the partition wall for supplying an island part polymer, and sea part polymer inlets positioned in a peripheral part of the partition wall for supplying a sea part polymer, a plurality of said projection wing members being aligned in parallel at an equal spacing in an opening of the partition wall, a ration of a thickness of a wing member to a space between an adjacent wing member being in a range of 30:1 to 1:30;

a spinning seat, mounted under the spinning head, having a funnel-shaped spinning nozzle for spinning the sea part polymer and the island part polymer into an optical fiber; and a guide member, mounted around the partition wall, for guiding the flow of the sea part polymer so as to introduce the sea part polymer supplied from the sea part polymer inlets to the funnel-shaped spinning nozzle through spaces between adjacent projection wing members of the partition wall.

2. A fabrication machine of optical fiber of claim 1, wherein the guide member includes through-holes connecting the sea part polymer inlets to the funnel-shaped spinning nozzle.

3. A fabrication machine of optical fiber of claim 1, wherein the guide member is a plate having an opening to be matched to an external shape of the partition wall and having a step part to be fitted with the partition wall.

4. A fabrication machine of optical fiber of claim 2, wherein the guide member is a plate body having an opening to be matched to an external shape of the partition wall and having a step part to be fitted with the partition wall.

* * * * *